Patented Oct. 1, 1946

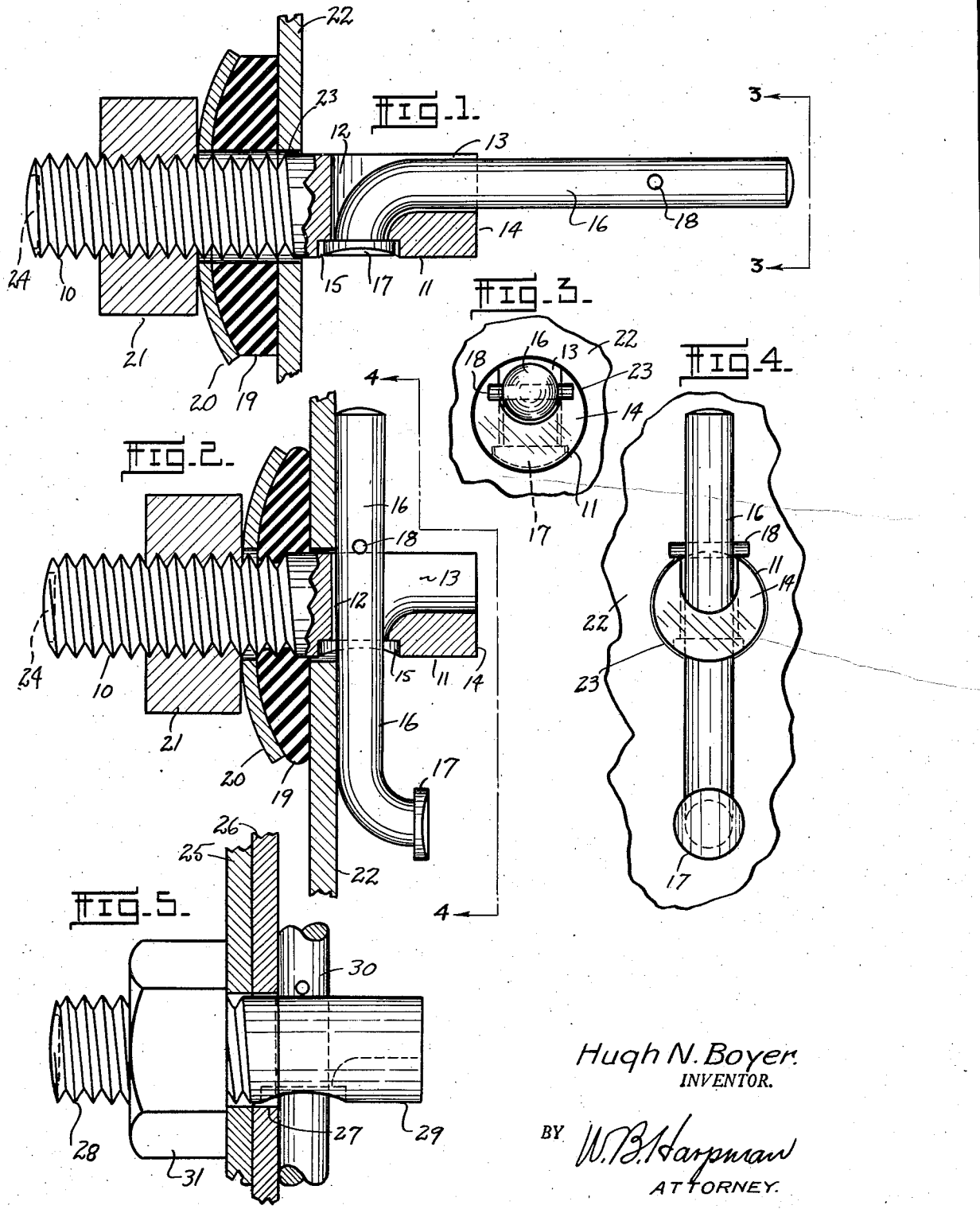

2,408,366

UNITED STATES PATENT OFFICE 2,408,366

TOGGLE BOLT

Hugh N. Boyer, near Canfield, Ohio

Application March 20, 1945, Serial No. 583,712

2 Claims. (Cl. 85—3)

This invention relates to a toggle bolt and more particularly to a toggle bolt which may be utilized in attaching various articles to a hollow wall and used in effecting a repair in a wall of a tank or similar structure.

The principal object of the invention is the provision of a toggle bolt insertable through an opening in a hollow wall or hollow article and operatable to engage the inner surface of said wall or article.

A further object of the invention is the provision of a toggle bolt, the toggle portion of which is capable of being positioned in axially extending relation to the bolt portion thereof.

A still further object of the invention is the provision of a toggle bolt, the bolt portion of which is provided with a transversely formed opening and a longitudinally extending slot associated therewith for the accommodation of a semi-L shaped toggle.

A still further object of the invention is the provision of a toggle bolt construction which may be effectively used in effecting a fastening to a hollow wall or a hollow article or which may be used in joining two adjacently positioned members to one another.

The toggle bolt shown and described herein has been designed to form a more effective toggle bolt construction than has been heretofore available for the various indicated purposes. The toggle bolt shown and described herein is constructed essentially of two relatively large and heavy structural parts, one of which is positioned partly in a transversely formed opening in the other and is therefore pivoted in relation thereto and which is capable of being positioned in transverse relationship to the other and employed as an anchor in a hollow article. The toggle bolt shown and described herein may be effectively used in connection with plugging openings in tanks and similar containers and in providing fastening means on large hollow articles or on hollow walls.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a cross sectional side elevation of a toggle bolt showing the same in connection with a resilient gasket assembly and mounted in insertable position in an opening in an article.

Figure 2 is a cross sectional side elevation of the toggle bolt illustrated in Figure 1 and shows the same in operative position plugging the opening through which it has been inserted.

Figure 3 is an end elevation of the toggle bolt shown in insertable position taken on lines 3—3 of Figure 1.

Figure 4 is an end elevation of the inserted toggle bolt taken on lines 4—4 of Figure 2.

Figure 5 is a side elevation with parts in cross section and parts broken away illustrating the toggle bolt utilized as a joining member or in attaching one article to another.

By referring to the drawing and Figures 1, 2, 3 and 4 in particular it will be seen that the toggle bolt consists of a threaded bolt portion 10 having an unthreaded end section 11 which is provided with a transversely formed opening 12 and a longitudinally positioned slot 13. The slot 13 extends from an end 14 of the unthreaded end section 11 of the bolt to communicate with the transversely positioned opening 12 therein. An enlarged annular area 15 is formed on one side of the unthreaded end 11 of the bolt 10 and adjacent to and in communication with the transversely positioned opening 12. Positioned in the transversely positioned opening 12 and the slot 13 and annular area 15 there is a semi-L shaped toggle 16 which is provided with a head 17 on its semi-L shaped end and with a transversely positioned pin or stop member 18 near its other end. As illustrated in Figures 1 and 2 of the drawing, the threaded bolt portion 10 of the toggle bolt assembly carries a resilient gasket 19, a concave washer 20 and a threaded nut 21, which nut 21 engages the threaded bolt 10 so as to move the concave washer 20 and the resilient gasket 19 against an article such as is indicated by the numeral 22 through which article 22 the toggle bolt is positioned by means of inserting the same through an opening 23 in the article 22.

It will be observed by referring to Figures 1 and 3 of the drawing that the toggle 16 in axially extending position in relation to the bolt 10 occupies an area of smaller diameter than the diameter of the bolt 10 itself. The construction thus provided is capable of insertion through a relatively small opening such as 23 in the article 22 and at the same time enables the toggle portion 18 of the toggle bolt to be of relatively large size in relation to the remainder of the bolt 10 and hence be capable of providing a sturdy, durable anchor for the toggle bolt.

By referring now to Figures 2 and 4 of the drawing it will be seen that the toggle bolt upon being inserted, as illustrated in Figure 1, has been rotated so as to cause the headed end 17 of the toggle 16 to drop downwardly out of the transversely positioned opening 12 in the bolt 10 and thereby swing the majority of the toggle 16 into vertical position with respect to the horizontally positioned bolt 10. The pin or stop member 18 serves to hold the toggle 16 in appropriate position, as illustrated in Figures 2 and 4, and this vertical positioning is indicated to the manipulator of the device by the appropriate positioning of a screw driver slot 24 formed in the end of the threaded bolt 10. The bolt 10 may, therefore, be held in stationary position through the screw driver engaging the slot 24 while the nut 21 is turned against the concave washer 20 so as to compress the resilient gasket 19 as shown in Figure 2.

By referring now to Figure 4 of the drawing, an end elevation of the properly positioned toggle bolt assembly may be seen and it will be observed that the pin or stop member 18 positioned transversely of the toggle 16 supports the same in vertical position on the threaded end 11 of the bolt 10 and thereby enables the device to offer a satisfactory, broadly spaced anchor which will suitably support the toggle bolt with respect to the tension applied thereto as by the tightening up of the nut 21.

It is obvious to those skilled in the art that the toggle bolt construction shown and heretofore described herein may also be used in attaching it to hollow walls or hollow wall articles and in which use the resilient gasket is neither indicated nor desirable.

By referring to Figure 5 of the drawing such use of the toggle bolt construction may be seen wherein an article 25 is shown held in position against a supporting wall or structure 26, which wall or structure is provided with an opening 27 therein. The toggle bolt shown in Figure 5 consists of a partially threaded bolt 28 having an unthreaded end section 29 and a toggle 30 positioned transversely therein in the manner illustrated and described in connection with the toggle bolt construction shown in Figures 1 through 4 and heretofore described. A nut 31 threadably positioned on the threaded bolt 28 enables the device to be pulled together as in attaching the article 25 to the article 26, it being observed that the portions of the toggle 30 are broken away in the drawing, and further that the toggle 30 provides a suitable anchor bridging a considerable area on the inner side of the article 26 to satisfactorily mount the article 25 thereagainst. This construction and that illustrated in Figures 1 through 4 of the drawing make advantageous use of the relatively large sized toggle portions 16 and 30, respectively, for providing a secure and dependable toggle bolt construction of long life not dependent upon any small, readily destructible portions.

It will thus be seen that a toggle bolt which may be economically fabricated of simple parts and hence widely distributed at low cost and advantageously used due to its simple operating characteristics and dependable on installation has been provided.

Having thus described my invention, what I claim is:

1. In a fastener, a partially threaded body member adapted for insertion through openings in articles to be fastened, a nut threaded on said threaded body member, an opening formed transversely in the unthreaded portion of the said body member, and a slot formed between the said opening and the unthreaded end of the said member, a toggle having a curved headed end freely positioned in said opening and pin means inwardly from the other end of said toggle for limiting its movement with respect to the said body member.

2. In a toggle bolt, a partially threaded body member having a transversely formed opening in the unthreaded portion thereof near the unthreaded end thereof and a slot formed between the said transversely positioned opening and the said unthreaded end thereof, a toggle member consisting of a section of round material curved at one end and provided with a head thereon freely positioned in said opening and capable of movement therein, pin means on said toggle for preventing it from falling out of the said body member, and a nut threadably positioned on the threaded portion thereof.

HUGH N. BOYER.